W. TRENT.
SPOOL.
APPLICATION FILED AUG. 15, 1913.
1,119,552.
Patented Dec. 1, 1914.
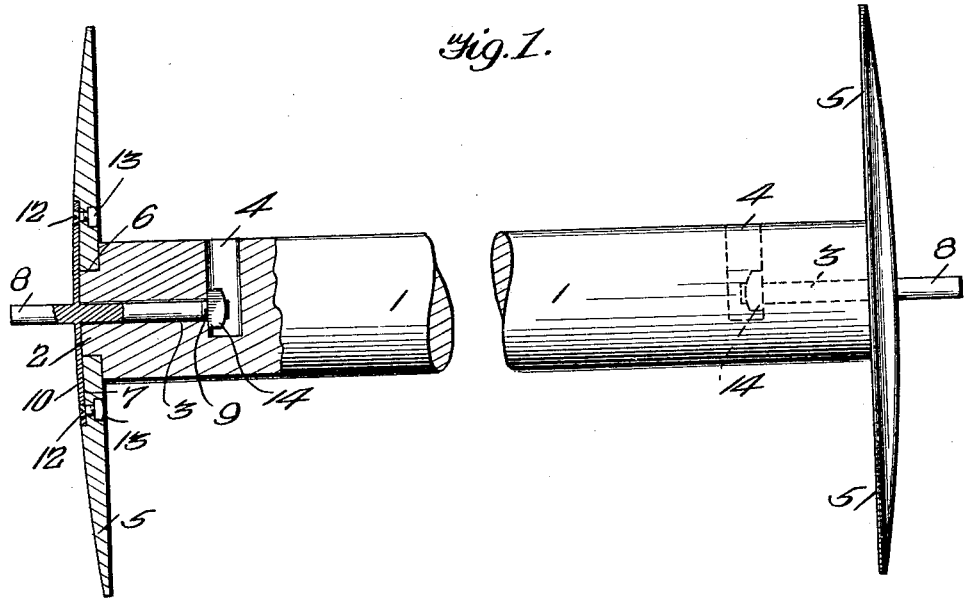
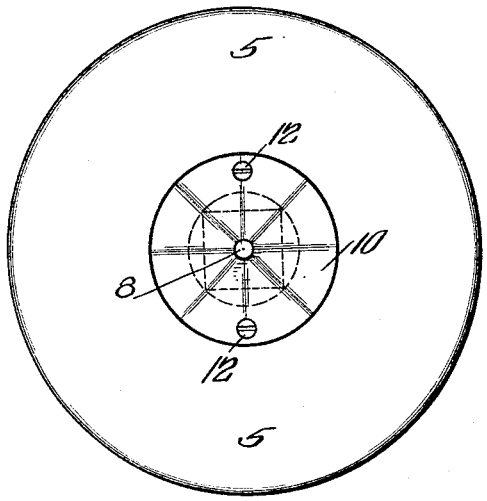
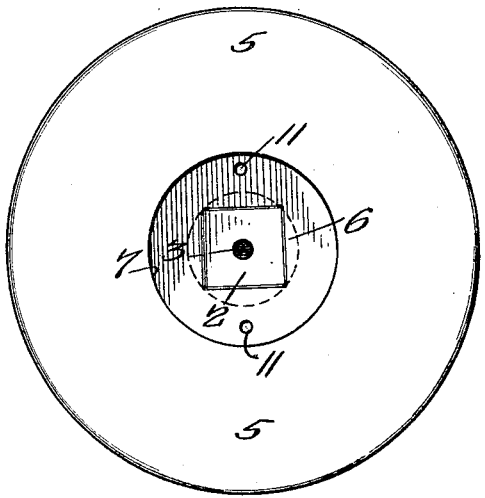
WITNESSES
E. M. Callaghan
C. E. Trainor
INVENTOR
WILLIAM TRENT,
BY Munn & Co.
ATTORNEYS

UNITED STATES PATENT OFFICE.

WILLIAM TRENT, OF STOTTVILLE, NEW YORK, ASSIGNOR OF ONE-HALF TO FRANK STRONG STOTT, OF STOTTVILLE, NEW YORK.

SPOOL.

1,119,552.  Specification of Letters Patent.  Patented Dec. 1, 1914.

Application filed August 15, 1913. Serial No. 784,958.

*To all whom it may concern:*

Be it known that I, WILLIAM TRENT, a citizen of the United States, and a resident of Stottville, in the county of Columbia and State of New York, have invented a new and useful Improvement in Spools, of which the following is a specification.

My invention is an improvement in spools, and has for its object to provide a spool comprising a body, and heads detachably connected with the body, and so arranged that when the said heads become mutilated or broken, they may be removed from the body and a new head attached.

In the drawings:—Figure 1 is a side view of the improved spool with parts in section, Fig. 2 is an end view, and Fig. 3 is a similar view, with the journal pin and its attachments removed.

The present embodiment of the invention comprises a body 1 of cylindrical form and provided at each end with a reduced extension 2, the said extensions being square in cross section. At each end the body of the spool is provided with an axial opening 3, which communicates at its inner end with a radial recess 4. The recess 4 as shown in Fig. 1, extends beyond the center of the spool, and a head 5 is connected to each end of the spool. Each of the said heads is the segment of a sphere as shown, and is arranged with its plane face inwardly. Each head is provided with a central opening 6, the said opening being shaped to fit and receive one of the extensions 2 of the body. Each head is also provided on its outer face with a circular recess 7, and a journal pin 8 is connected with each head. Each of the said journal pins is provided at its inner end with a threaded portion 9, and near its outer end with an annular radially extending flange 10, which is shaped to fit the recess 7 of the head. The said flange is provided with oppositely arranged openings 11, and screw bolts 12 are passed through the openings and through the head, from without inwardly, and are engaged by nuts 13 at the inner face of the head. Each of the openings 11 is reamed or counterbored to receive the head of the screw, and the inner face of the head is counterbored to receive the nut 13, the arrangement being such that the head of the screw bolt is flush with the outer face of the flange and the inner face of the nut is flush with the inner face of the head.

The journal pin 8 is of such length that when the flange 10 is fitted in the recess 7, the threaded portion 9 of the said journal pin will extend into the recess 4, and a nut 14 is threaded on to the said inner end in the recess.

The spool is assembled in the following manner:—One of the heads 5 is first placed with the extension 2 engaging the opening 6. The nut 14 is then inserted in the recess 4, and the journal pin is turned to engage the threaded portion 9 thereof with the said nut. It will be noticed that the diameter of the recess 7 is much greater than that of the opening 6, so that the flange 10 laps upon the head around the opening 6. After the journal pin has been turned to bring the flange thereof tightly against the bottom of the recess 7, the screw bolts 12 are then placed, and engaged with the nuts 13.

The recesses or counterbores for receiving the nuts 13 are shaped to fit the said nuts and to hold the nuts from rotation, and the screw bolts are turned by means of a screw driver or the like engaging the kerf in the head.

As is known, spools of the character in question, are subjected to rough usage, and the heads soon become mutilated, and when so mutilated, the said heads are very liable to injure the roving or thread upon the spool. With the ordinary form of spool, when the head becomes mutilated, the spool is discarded and replaced by a new spool. With the present construction when a head becomes mutilated it may be detached from the body and replaced by a new one. Thus a single body may be used indefinitely.

To remove a broken or injured head, it is only necessary to remove the screw bolts 12 and rotate the journal pin to release the nut 14. The journal pins may also be used indefinitely, since they are not liable to injury.

I claim:—

1. A spool comprising a body having at each end a reduced polygonal extension and having at each end an axial opening and a radial recess with which the opening communicates, heads each having a central polygonal opening fitting the extension, and a journal pin for insertion in the axial opening, said journal pin having an annular flange near its outer end and of greater diameter than the diameter of the body, the outer face of the head being recessed to receive the flange, said journal pin extending into the radial recess and having its inner end threaded, a nut in the recess engaging the threaded end of the journal pin, and screw bolts for connecting the flange to the head, the flange and the head having registering openings for receiving the screw bolts, the said bolts being flush with the faces of the heads.

2. In combination, a spool comprising a body having a reduced polygonal extension at each end and an axial opening and a radial recess at the inner end of the opening, heads having openings fitting the extensions, a journal pin engaging the axial opening and provided with an integral annular flange intermediate its ends for engaging the outer face of the head, the inner end of the journal pin being adapted to enter the axial opening, a nut in the recess into which the inner end of the journal pin is threaded, and a connection between the flange and the head.

3. The combination with the spool body and the detachable head, of a releasable connection between the head and the body, said connection comprising a polygonal opening in the head, and an extension of the body fitting the opening, a journal pin extending into the outer end of the head and having an integral annular flange engaging the outer face of the head, a detachable connection between the head and the flange, and a detachable connection between the inner end of the journal pin and the body.

WILLIAM TRENT.

Witnesses:
 THOMAS J. BROWN,
 ANDREW SCOTT.

Copies of this patent may be obtained for five cents each, by addressing the "Commissioner of Patents, Washington, D. C."